United States Patent [19]
Petersen

[11] 4,265,530
[45] May 5, 1981

[54] SHUTTER BLADE DRIVE SYSTEM

[75] Inventor: Christian C. Petersen, Westwood, Mass.

[73] Assignee: Polaroid Corporation, Cambridge, Mass.

[21] Appl. No.: 45,830

[22] Filed: Jun. 5, 1979

[51] Int. Cl.$^3$ .................. G03B 9/14; H02K 41/00; H02K 41/02
[52] U.S. Cl. .................................... 354/235; 310/13
[58] Field of Search ............... 354/234, 30, 235, 261, 354/50, 265; 310/13

[56] References Cited
U.S. PATENT DOCUMENTS

| | | | |
|---|---|---|---|
| 3,176,170 | 3/1965 | Fulton et al. | 354/235 X |
| 3,466,993 | 9/1969 | Fahlenberg et al. | 354/235 |
| 3,533,346 | 10/1970 | Erlichman et al. | 354/234 |
| 3,619,673 | 11/1971 | Helms | 310/13 |
| 3,882,522 | 5/1975 | Erlichman | 354/30 |
| 3,922,698 | 11/1975 | Petersen | 354/235 |
| 4,121,235 | 10/1978 | Fujita et al. | 354/234 |

*Primary Examiner*—Donald A. Griffin
*Attorney, Agent, or Firm*—Alfred E. Corrigan

[57] ABSTRACT

Photographic apparatus for controlling the opening and closing of a photographic shutter. In a preferred embodiment, the apparatus includes a linear motor having a first output for incrementally driving the blades of the shutter from a closed orientation to an open orientation. The linear motor includes a second output which rapidly returns the blades to the closed orientation to terminate the exposure interval. In an alternative embodiment of the invention, the coil of the linear motor is energized in manner so as to create a magnetic field which is in opposition to a magnetic field which exists between two permanent magnets mounted within the linear motor to drive the shutter blades into an open orientation. One of the magnets is fixedly secured in place while the other magnet is the armature of the linear motor and accordingly is connected to the shutter blades. The magnetic poles of the magnets are orientated such that common poles of said magnets face each other thereby providing a force for moving the armature away from the fixed magnet to drive the shutter blades into a closed orientation.

15 Claims, 8 Drawing Figures

SHUTTER BLADE DRIVE SYSTEM

RELATED APPLICATIONS

This application is related to my application Ser. No. 045,822 entitled "Linear Motor," filed on even date herewith.

BACKGROUND OF THE INVENTION

1. Field of the Invention

This invention relates to photographic apparatus for controlling the opening and closing of a photographic shutter.

2. Description of the Prior Art

Conventional shutter mechanisms, such as that shown in U.S. Pat. No. 3,533,346, are designed to utilize the advantageous characteristics of springs to derive the opening movement of the shutter blades. Such springs provide both desirable consistency of dynamic performance as well as relatively high available energy. To operate the shutters, power is required and, in most applications that power is delivered to the springs by an energy storing cocking procedure through a solenoid actuated ratchet assembly, as in the above-mentioned patent, or through a hand-driven device such as a film advance lever.

With the advent of the miniature but fully automated camera, a need was developed for a correspondingly compact shutter assembly which would remain accurate while operating under relatively low power levels, i.e., the compactness of the shutter assembly foreclosed the use of relatively large, strong springs for driving the shutter blades. Such an assembly is shown in U.S. Pat. No. 3,882,522 wherein a stepper motor is used to sequentially move the shutter blades toward a fully open orientation and then the motor is energized in an opposite directional sense to reverse the direction of movement of the shutter blades and return them in steps to a closed orientation. By so stepping the blades into the open position, mass-accelerative forces are materially reduced thereby minimizing any overshoot at the time that the direction of movement of the blades is reversed.

SUMMARY OF THE INVENTION

The instant invention relates to photographic apparatus for controlling the opening and closing of a photographic shutter. In a preferred embodiment of the invention, the apparatus includes a linear motor which has a first output member coupled to a pair of shutter blades for sequentially moving the blades from a closed orientation to an open orientation, and a second output member which, when actuated, is adapted to rapidly return the blades to the closed orientation.

The linear motor includes a bobbin for supporting two field coils and an armature comprising a steel core having a permanent magnet secured at opposite ends thereof. The armature is mounted within a passageway in the bobbin for reciprocating movement. First and second output members are secured to opposite ends of the armature and extend to the exterior of the linear motor where their movement is adapted to be transferred to the shutter blades.

The first output member is coupled to the shutter blades by an electromagnet which is fixedly secured to the first output member for movement therewith. The windings of the electromagnet are located in parallel with the windings of the first field coil such that as the first field coil is sequentially energized to move the armature and the first output member in a first direction, the electromagnet is also sequentially magnetized. An iron or a steel rod, having one end connected to the shutter blades, is mounted closely adjacent to the electromagnet such that each time the latter is magnetized and simultaneously moved in the first direction it magnetically draws the rod along with it thereby sequentially moving the shutter blades to the open orientation. When the correct exposure has been obtained, the second field coil is energized to move the second output member so as to rapidly return the blades to the closed orientation. The stroke of the second output member is several times that of the first output member thereby permitting a single stroke of the second output member to rapidly return the blades to the closed orientation.

In an alternative embodiment of the invention, the linear motor has a single output member which is connected to a first permanent magnet at one end and to the blades at its other end. The first permanent magnet is slidably mounted within a passageway in the bobbin and functions as the armature of the linear motor. A second permanent magnet is fixedly secured within a closed end of the passageway such that the facing surfaces of the two magnets are of the same polarity.

So orientated, the two permanent magnets create a magnetic field having a force which maintains the first magnet against a stop in spaced relation to the second magnet. A spring having a biasing force less than that of the magnetic field is coupled to the first magnet for biasing it toward the second magnet. When the first magnet is being held against the stop by the magnetic repulsive forces acting between the two magnets, the single output member is maintaining the blades in a closed orientation. The output member steadily moves the blades into the open orientation in response to the field coil of the motor being energized. As the field coil is being energized, it produces a magnetic field having a force in opposition to that normally occurring between the two permanent magnets. In other words, energizing the field coil reduces the magnetic force acting between the magnets to a level below that of the biasing spring thereby allowing the latter to move the first magnet towards the second magnet thereby moving the shutter blades into an open orientation. The degree to which the shutter blades are moved into the open orientation, i.e., the size of the aperture, is directly proportional to the current flow in the field coil. When the proper exposure has been obtained, the current to the field coil is terminated and the repulsive forces normally acting between the two magnets rapidly moves the first magnet against the stop thereby terminating the exposure.

An object of the invention is to provide photographic apparatus for sequentially opening the blades of a shutter and for rapidly returning the blades to a closed orientation.

Another object of the invention is to magnetically couple one output of a linear motor to the blades of a shutter for sequentially moving the blades into an open orientation and to physically couple a second output of the motor to the blades so as to rapidly move them to a closed orientation.

Another object of the invention is to use the normal repulsive magnetic force acting between similar poles of two permanent magnets to move the blades of a shutter into a closed orientation.

Still another object of the invention is to energize a field coil in such a direction that it reduces the strength of a magnetic field existing between two closely spaced permanent magnets, thereby enabling the magnets to move relative to each other, such movement being transmitted to a positionable object.

Other objects of the invention will in part be obvious and will in part appear hereinafter.

The invention accordingly comprises the apparatus possessing the construction, combination of elements, and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
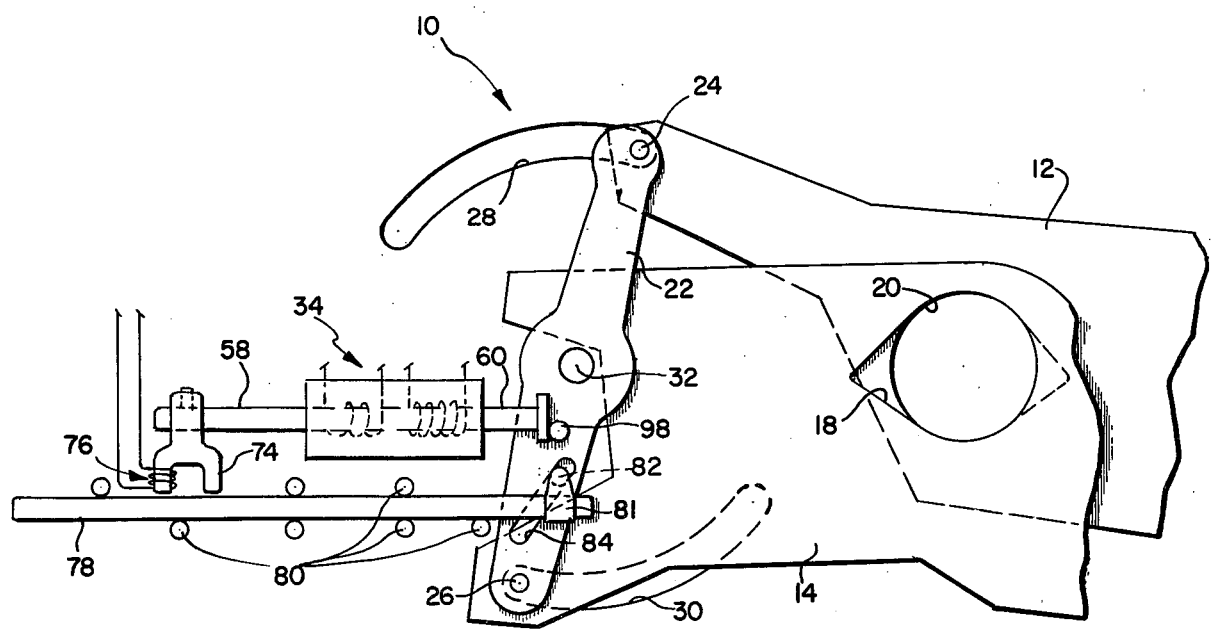
FIG. 1 is an elevational view of a photographic shutter system, the shutter blades being shown in a fully opened orientation.
Figure 2:
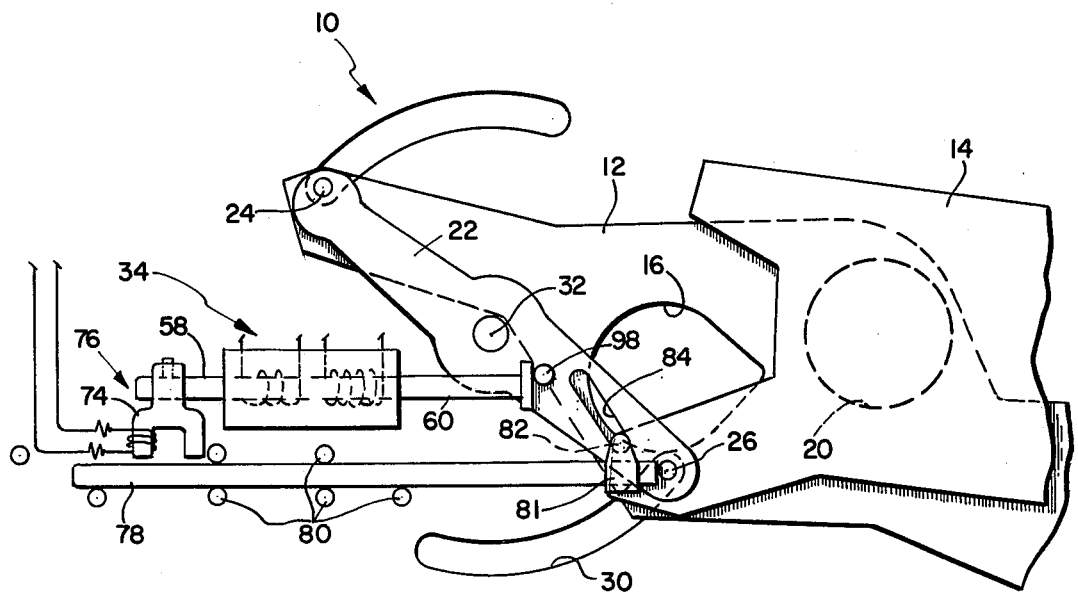
FIG. 2 is a view similar to FIG. 1 showing the shutter blades in a closed orientation and motor energized for closing.

Reference is now made to FIGS. 1 and 2 of the drawings wherein is shown a preferred embodiment of a photographic shutter system generally designated by the reference numeral 10.

The shutter system 10 includes a pair of shutter blades 12 and 14 having tapered apertures 16 and 18, respectively, which symmetrically overlap about the center of a stationary aperture 20 to define a variation of aperture values. The blades 12 and 14 are mounted for movement between a closed orientation, as shown in FIG. 2, and an open orientation, as shown in FIG. 1. For more details on the mounting of the blades 12 and 14, reference may be had to U.S. Pat. No. 3,942,183. Each of the blades 12 and 14 is pivotally coupled to a link or walking beam 22 by a pin 24 and 26. The pins 24 and 26 are adapted to be located within arcuate slots 28 and 30 for guiding the rotation of the walking beam 22 about its pivot 32.

A linear motor 34 is provided for driving the blades 12 and 14 between the closed and open orientations. The linear motor 34, shown diagrammatically in FIGS. 1 and 2 and in cross-section in FIG. 3, includes a cylindrically shaped bobbin 36 having spaced cheeks 38, 40 and 42 and a longitudinally extending passageway 44. A first field coil 46 is wound upon the bobbin between the cheeks 38 and 40 and a second field coil 48 is similarly mounted on the bobbin 36 between the cheeks 40 and 42.

A longitudinally extending cylindrically shaped armature 50 is slidably mounted in the passageway 44 for movement in first (to the left as viewed in FIG. 3) and second directions. The armature 50 includes a core 52, preferably formed from steel, and two permanent magnets 54 and 56, preferably formed from a rare earth material such as samarium cobalt. Each of the magnets 54 and 56 has its magnetic north pole N fixedly secured to an end face of the core 52 such that the magnetic south poles S of the magnets define the opposite magnetic ends of the armature. A first output member 58 is fixedly secured to the south pole S of the magnet 54 while a second output member 60 is fixedly secured to the corresponding pole of the magnet 56.

A pair of washers 62 and 64, preferably formed from a magnetically permeable material such as soft steel, are mounted on each end of the bobbin 36 and are secured in place by a pair of end caps 66 and 68. The end caps are provided with centrally located apertures 70 and 72 for permitting the passage of the first and second output members 58 and 60. The bobbin 36, the end caps 66 and 68 and the output members 58 and 60 are preferably formed from a nonconducting material such as Delrin, a thermoplastic resin sold by E. I. DuPont de Nemours and Company.

Figure 4:
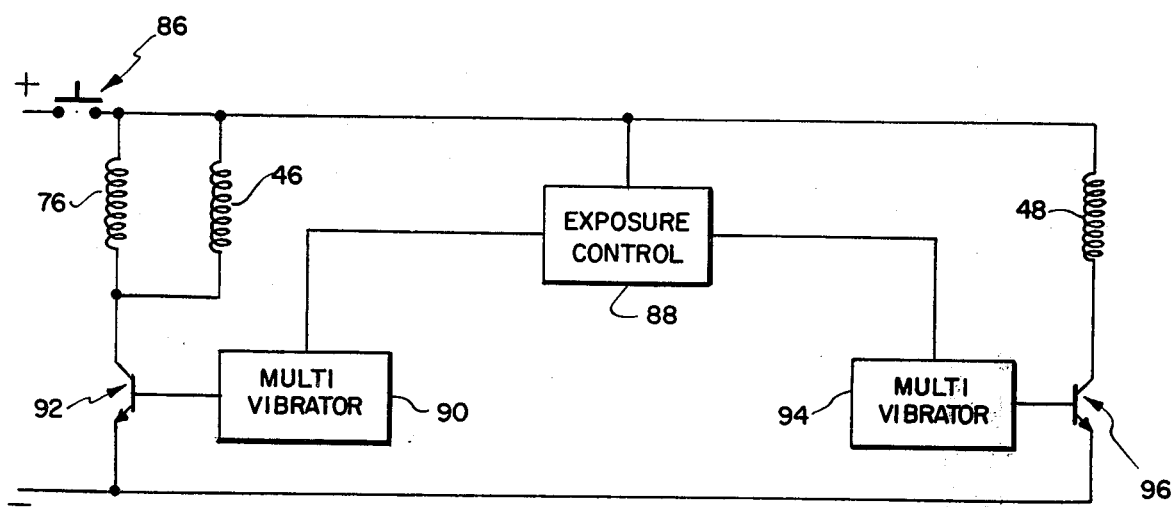
FIG. 4 is a schematic circuit diagram for the system shown in FIGS. 1 and 2.

An electromagnet 74 having a field coil 76 is fixedly secured to the first output member 58. The coil 76 is located in parallel with the first field coil 46, as shown in FIG. 4, so that it will magnetize the electromagnet 74 every time that the first field coil 46 is connected to a source of direct current.

A rod 78 formed from a magnetically permeable material is slidably mounted underneath the electromagnet 74 by a plurality of pins 80. The pins 80 provide a frictional force for maintaining the rod 78 in place when the linear motor is not energized. One end of the rod 78 is coupled to the walking beam 22 by a flange 81 having an inwardly directed pin 82 which rides in a guide slot 84 located in the walking beam 22.

An exposure interval is initiated by depressing the shutter release button 86 (see FIG. 4) thereby connecting an exposure control 88 with a source of direct current. The exposure control 88 turns on an astable multivibrator 90 which sequentially places a transistor 92 in a conducting and non-conducting condition of approximately two milliseconds each. During each two millisecond period that the transistor is in a conducting condition the coils 46 and 76 are being simultaneously energized. Energizing the coil 46 causes the armature 50 and the electromagnet 74 to move in a first direction until the end of the magnet 54 engages the end cap 66. Since the electromagnet 74 is magnetized during this movement, it magnetically draws the rod 78 along with it thereby rotating the walking beam 22 in a clockwise manner. When the transistor 92 becomes non-conducting, the armature 50 returns to the position shown in FIG. 3 while the pins 80 frictionally retain the rod 78 in position. As is more fully explained in my copending application Ser. No. 045,822, when the armature is moved from its first position (shown in FIG. 3) to a second position wherein the magnet 54 is in engagement with the end cap 66, it has traveled through a distance less than one-half the distance between the poles S and N of the permanent magnet 54. Accordingly, when the armature is in the second position, the south pole S of the magnet 54 is still located closer to the washer 62 than is the north pole N of the magnet 54. So located, the greater magnetic affinity between the south pole S of the magnet 54 and the washer 62 automatically returns the armature to the first position wherein the south pole S is located substantially in alignment with the washer 62.

Figure 3:
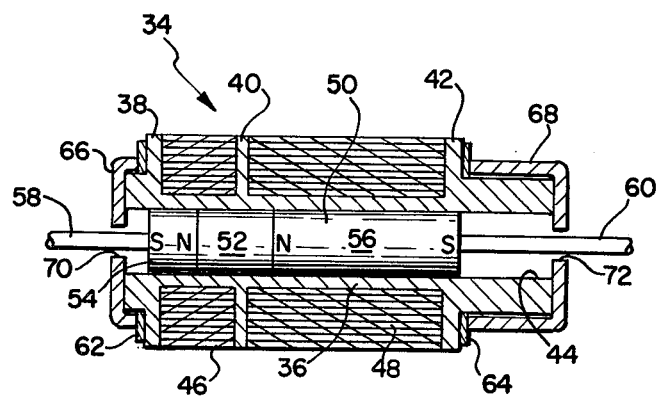
FIG. 3 is an enlarged elevational view of a linear motor used in the system shown in FIGS. 1 and 2.
Figure 5:
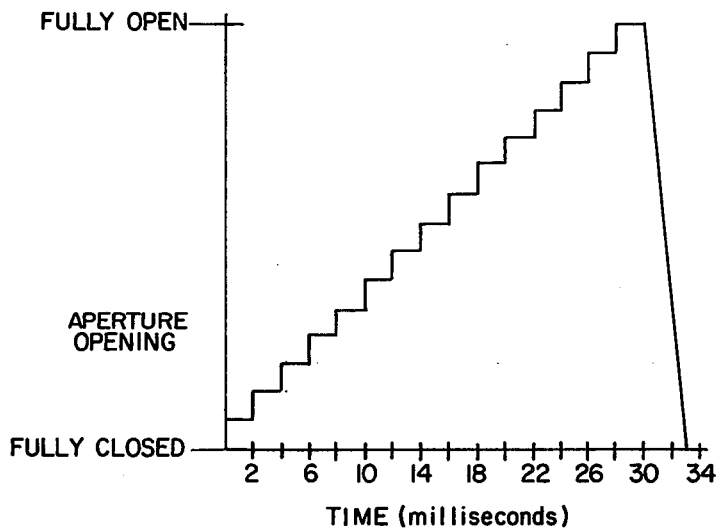
FIG. 5 is a graph representing the relationship between the aperture opening and time for the shutter system shown in FIGS. 1-4.
Figure 8:
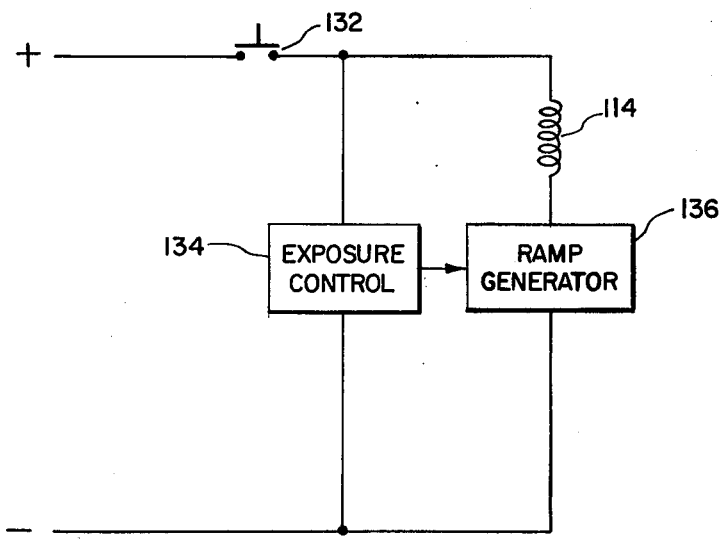
FIG. 8 is a schematic circuit diagram for the system shown in FIGS. 6 and 7.

The astable multivibrator 90 continues to turn the transistor 92 off and on thereby sequentially indexing or stepping the shutter blades 12 and 14 toward a fully open orientation such as is shown in FIG. 1. When the exposure control 88 detects that the proper exposure has been obtained, it shuts the astable multivibrator 90 off thereby placing the transistor 92 in a non-conducting state and simultaneously turns on a monostable multivibrator 94 which in turn places a transistor 96 in a conducting state. With the transistor in a conducting state, the second field coil 48 is energized thereby moving the armature 50 in a second direction (to the right as viewed in FIG. 3) until the south pole S of the magnet 56 engages the end cap 68. This position will hereinafter be referred to as the third position. It will be noted that the distance traveled by the armature 50 in moving from the first position to the third position is substantially greater than that traveled by the armature 50 in moving from the first position to the second position. In one example the former distance was 3.81 mm (0.150 inch) as compared to 0.762 mm (0.030 inch) for the latter distance, a magnitude of five. As the armature 50 moves in the second direction, the second output member 60 moves into engagement with a pin 98 extending outwardly from the walking beam 22 and rapidly rotates the latter in a counterclockwise direction into the position shown in FIG. 2, thereby placing the shutter blades 12 and 14 in a closed orientation. As can be seen from the graph in FIG. 5, the time for moving the blades from the full open to full closed orientation is approximately three milliseconds. Once the blades 12 and 14 are fully closed, the exposure control 88 turns the monostable multivibrator 94 off thereby placing the transistor 96 in a non-conducting state and deenergizing the second field coil 48. With the second field coil 48 in a deenergized state, the armature 50 automatically returns to the first position under the influence of the washer 64. In other words, the armature 50 automatically returns to the first position because the distance between the first and third positions is slightly less than one-half the distance between the ends of the magnet 56. Accordingly, when the armature 50 is in the third position, the south pole S of the magnet 56 has a greater affinity for the steel washer 64 than does the north pole N. This greater affinity results in the armature 50 returning to the first position wherein the south pole S of the magnet is located in substantial alignment with the washer 64, as shown in FIG. 3.

Figure 6:
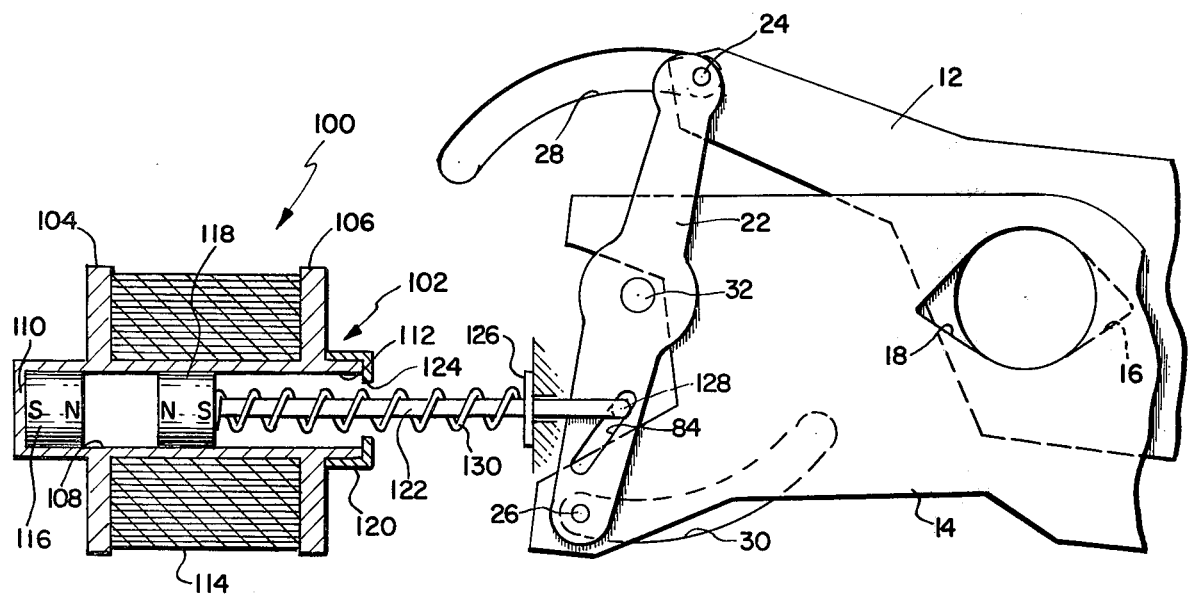
FIG. 6 is an elevational view of an alternative embodiment of a photographic shutter system, the blades of the shutter being in a fully open orientation.
Figure 7:
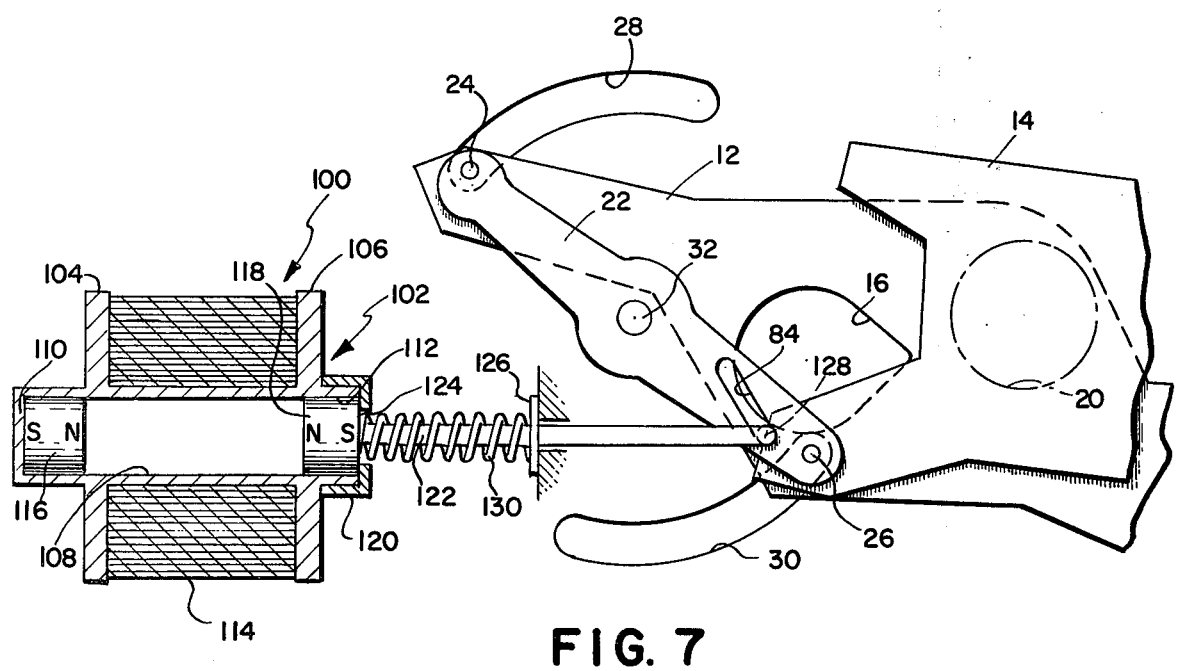
FIG. 7 is a view similar to FIG. 6 showing the shutter blades in a closed orientation.

Reference is now made to FIGS. 6 and 7 of the drawings wherein is shown and alternative embodiment of the invention. In this embodiment, the shutter blades 12 and 14 are driven between their open and closed orientations by a linear motor 100. The motor 100 includes a generally cylindrically shaped bobbin 102 having a pair of spaced annular cheeks 104 and 106 and a longitudinally extending cylindrically shaped passageway 108 having a closed end 110 and an open end 112. Electrically conductive means in the form of a field coil 114 is wound upon the bobbin 102 in surrounding relation to the passageway 108. A first permanent magnet 116 is fixedly secured within the closed end 110 of the passageway 108. The armature of the linear motor 100 consists of a second permanent magnet 118. The poles of the magnets 116 and 118 are orientated such that common poles face each other thereby producing a magnetic field whose force moves the magnet 118 in a first direction until it is stopped by an end cap 120 fixedly secured to the bobbin 102.

The magnet 118 is secured to an output member 122 which in turn extends through an aperture 124 in the end cap 120 and through an aperture in a fixed bearing plate 126. An end of the output member 122 is coupled to the walking beam 22 by an inwardly directed pin 128 which rides in the guide slot 84. The second permanent magnet 118 is mechanically biased in a second direction toward the first permanent magnet 116 by a spring 130 which encircles the output member 122. The force of the spring is less than that which normally exists between the two magnets 116 and 118. Accordingly, the second permanent magnet 118 normally occupies the position shown in FIG. 7 wherein it abuts the end cap 120 and maintains the shutter blades 12 and 14 in a fully closed orientation. The output member 122 as well as the bobbin 102 and the end cap 120 are preferably formed from Delrin while the permanent magnets 116 and 118 are preferably formed from a rare earth material such as samarium cobalt.

An exposure interval is commenced by depressing a shutter release button 132 thereby connecting an exposure control 134 to a source of direct current. The exposure control 134 in turn controls a ramp generator 136 which generates a sweep voltage in the field coil 114 which increases linearly in value during one cycle of sweep, then returns to zero suddenly in preparation for another exposure cycle. As the voltage in the coil 114 increases, its magnetic field, which is in opposition to that which normally exists between the two magnets 116 and 118, produces an increasing force which coupled with the force produced by the spring 130 moves the magnet 118 toward the magnet 116. This movement is transmitted to the walking beam 22 via the output member 122 to rotate the former in a clockwise manner thereby moving the blades 12 and 14 toward their fully open orientation, as shown in FIG. 6. When the correct exposure has been obtained, the exposure control 134 shuts the ramp generator 136 down thereby deenergizing the field coil 114. With the field coil deenergized, the normal repulsive force existing between the poles of the magnets 116 and 118 rapidly returns the magnet 118 to the position shown in FIG. 7 thereby placing the shutter blades 12 and 14 in a fully closed orientation to end the exposure interval. In one example of a linear motor built according to this embodiment, the magnets 116 and 118 were 2.54 mm (0.100 inch) in width and 5.08 mm (0.200 inch) in diameter and were spaced 2.54 mm apart when the blades were fully opened, as shown in FIG. 6, and 7.62 mm (0.300 inch) when fully closed.

Since certain changes may be made in the above apparatus without departing from the scope of the invention herein involved, it is intended that all matter contained in the above description or shown in the accompanying drawings shall be interpreted as illustrative and not in a limiting sense. For example, it should be understood that although the facing poles in both embodiments have been shown as being north poles, they could also be the south poles of the magnets.

What is claimed is:

1. Photographic apparatus for controlling the opening and closing of a photographic shutter during an exposure interval comprising:

a photographic shutter including a pair of blades mounted for movement between a closed orientation and an open orientation in which scene light may pass to a focal plane;

means for connecting said blades for simultaneous movement between said closed and open orientations;

a linear motor adapted to be coupled to said connecting means for sequentially incrementally moving said blades from said closed orientation toward said open orientation, and for rapidly returning said blades to said closed orientation;

means for coupling said linear motor to said connecting means; and means for generating a sequence of electrical pulses to energize said linear motor in a first directional sense to step-wise displace said blades from said closed orientation toward said open orientation and for generating an electrical pulse to energize said linear motor in an opposite directional sense to rapidly return said blades to said closed orientation thereby terminating the exposure interval.

2. Photographic apparatus as defined in claim 1 wherein said coupling means includes electromagnetic means.

3. Photographic apparatus as defined in claim 2 wherein said generating means energizes said electromagnetic means in unison with said linear motor when said linear motor is being driven in said first directional sense.

4. Photographic apparatus for controlling the opening and closing of a photographic shutter during an exposure interval, comprising:

a photographic shutter including a pair of blades mounted for movement between a closed orientation and an open orientaion in which scene light may pass to a focal plane as said blades are moved between said closed and open orientations;

means for connecting said blades for simultaneous movement;

a linear motor including a field coil, a bobbin for supporting the windings of said field coil, an armature mounted for reciprocating movement within a passageway in said bobbin, said armature including a first permanent magnet at one end thereof and an output member coupled to said connecting means, a second permanent magnet fixedly secured within said passageway such that the same magnetic poles of each of said magnets face each other thereby producing a magnetic field therebetween having a force sufficient to move said armature in a first direction into a closed shutter position, and means for biasing said armature in a second direction opposite to said first direction and toward said first permanent magnet, said biasing means providing a force less than the force created by said magnetic field; and means for energizing said field coil in a manner so as to create a magnetic field in opposition to the magnetic field naturally occurring between said first and second permanent magnets to reduce its force to a level below that of said biasing means whereby said biasing means moves said armature in said second direction to thereby move said blades from said closed orientation toward said open orientation.

5. Photographic apparatus as defined in claim 4 wherein said first and second permanent magnets are formed from a rare-earth material.

6. Photographic apparatus as defined in claim 4 wherein said first and second permament magnets are formed from samarium cobalt.

7. A linear motor comprising:

means for supporting electrically conductive means, said supporting means including means defining a passageway extending axially of said supporting means;

a first permanent magnet fixedly mounted within said passageway with its magnetic poles orientated along said passageway;

an armature including a second permanent magnet and an ouput member mounted within said passageway for axial movement between first and second opposite positions, the magnetic poles of said second permanent magnet being orientated along said passageway such that common poles of said first and second permanent magnets face each other and create a magnetic field having a force sufficient to move said armature into said first position;

means for resiliently biasing said armature toward said second position, said biasing means having a force less than that created by said magnetic field;

electrically conductive means wound upon said supporting means; and means for energizing said electrically conductive means in a manner so as to create a magnetic field in opposition to the magnetic field naturally occurring between said first and second permanent magnets to reduce its force to a level below that of said biasing means whereby said biasing means moves said armature in said second direction.

8. A linear motor as defined in claim 7 wherein said first and second permanent magnets are formed from a rare-earth material.

9. A positioning device comprising:

a linear motor including an armature having first and second output members and electrically conductive means selectively energizable to move said armature in first and second directions, respectively;

an electromagnet fixedly secured to said first output member;

a link adapted to be coupled to a positionable member;

means for mounting said link for movement in said first and second directions, said mounting means maintaining said link adjacent to said electromagnet as said link is moved in said first and second directions; and means for simultaneously energizing the winding of said electromagnet and said electrically conductive means to thereby magnetize said electromagnet and magnetically draw said link in said first direction as said armature is moved in said first direction and for alternatively energizing said electrically conductive means so as to move said armature in said second direction so as to move said second output member into engagement with the positionable member.

10. A positioning device as defined in claim 9 wherein said electrically conductive means includes first and second coils selectively engergizable to move said armature in said first and second directions, respectively.

11. A positioning device as defined in claim 10 wherein the force created by energizing said second coil is substantially greater than that created by energizing said first coil.

12. A positioning device as defined in claim 11 wherein said armature includes a core and a pair of permanent magnets fixedly secured to opposite end faces of said core.

13. A positioning device as defined in claim 11 wherein the distance traveled by said armature under the influence of the force created by energizing said second coil is substantially greater than the distance traveled by said armature in said first direction under the influence of the force created by energizing said first coil.

14. Photographic apparatus for controlling the opening and closing of a photographic shutter during an exposure interval comprising:
- a photographic shutter including a pair of blades mounted for movement between a closed orientation and an open orientation in which scene light may pass to a focal plane;
- means for connecting said blades for simultaneous movement between said closed and open orientations;
- a linear motor adapted to be coupled to said connecting means for incrementally moving said blades from said closed orientation toward said open orientation, and for rapidly returning said blades to said closed orientation, said linear motor including an armature having a first output member;
- means for coupling said linear motor to said connecting means, said coupling means including a rod having one end secured to said connecting means and an electromagnet fixedly secured to said first output member in close proximity to said rod; and
- means for generating a sequence of electrical pulses to energize said linear motor in a first directional sense to displace said blades from said closed orientation toward said open orientation and for generating an electrical pulse to energize said linear motor in an opposite directional sense to rapidly return said blades to said closed orientation thereby terminating the exposure interval, said generating means being adapted to energize the winding of said electromagnet each time said linear motor is driven in said first directional sense thereby magnetically drawing said rod in the same direction so as to move said blades toward said open orientation.

15. Photographic apparatus as defined in claim 14 wherein said armature includes a second output member adapted to move into engagement with said connecting means when said linear motor is driven in said opposite directional sense to rapidly return said blades to said closed orientation.

* * * * *